United States Patent
Watanabe et al.

(10) Patent No.: US 9,769,707 B2
(45) Date of Patent: Sep. 19, 2017

(54) COMMUNICATION SYSTEM, BASE STATION, GATEWAY DEVICE, BASE STATION CONTROL METHOD, AND GATEWAY DEVICE CONTROL METHOD

(71) Applicant: NEC CORPORATION, Tokyo (JP)

(72) Inventors: Tomohiro Watanabe, Tokyo (JP); Atsushi Nakata, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/896,422

(22) PCT Filed: Feb. 4, 2014

(86) PCT No.: PCT/JP2014/000573
§ 371 (c)(1),
(2) Date: Dec. 7, 2015

(87) PCT Pub. No.: WO2014/199535
PCT Pub. Date: Dec. 18, 2014

(65) Prior Publication Data
US 2016/0142942 A1 May 19, 2016

(30) Foreign Application Priority Data

Jun. 11, 2013 (JP) ................... 2013-122895

(51) Int. Cl.
*H04W 36/00* (2009.01)
*H04W 92/20* (2009.01)
*H04W 84/04* (2009.01)

(52) U.S. Cl.
CPC .... *H04W 36/0005* (2013.01); *H04W 36/0016* (2013.01); *H04W 36/0055* (2013.01); *H04W 84/045* (2013.01); *H04W 92/20* (2013.01)

(58) Field of Classification Search
CPC ......... H04W 36/0005; H04W 36/0016; H04W 36/0055; H04W 84/045; H04W 92/20
See application file for complete search history.

(56) References Cited

U.S. PATENT DOCUMENTS

| | | |
|---|---|---|
| 2010/0208704 A1* | 8/2010 | Wu .......................... H04L 12/66 370/331 |
| 2011/0274086 A1* | 11/2011 | Xu ......................... H04L 63/061 370/331 |

(Continued)

FOREIGN PATENT DOCUMENTS

| JP | 2012-521710 A | 9/2012 |
|---|---|---|
| JP | 2013-106334 A | 5/2013 |
| WO | 2012/146276 A1 | 11/2012 |

OTHER PUBLICATIONS

Nokia Siemens Networks, Introduction of intra-HNB-GW—inter-HNB mobility procedures using RNSAP, Nov. 15, 2010, 3GPP TSG-RAN WG3#70 R3-103535.

(Continued)

*Primary Examiner* — Ajit Patel
(74) *Attorney, Agent, or Firm* — Sughrue Mion, PLLC

(57) ABSTRACT

A base station (103), which is connected to a gateway device (105), comprising: a transmission unit (202) that transmits an Old Transport Info to the gateway device, and the Old Transport Info is an information which is not used by the gateway device when a handover occurs.

9 Claims, 15 Drawing Sheets

(56) References Cited

U.S. PATENT DOCUMENTS

| | | | |
|---|---|---|---|
| 2012/0002637 A1* | 1/2012 | Adjakple | H04W 36/0055 370/331 |
| 2012/0009913 A1 | 1/2012 | Yoon et al. | |
| 2012/0106456 A1* | 5/2012 | Jin | H04W 76/022 370/328 |

OTHER PUBLICATIONS

Catt, Discussion on routing X2AP messages with X2-GW, Oct. 11, 2010, 3GPP TSG-RAN WG3 #69bis R3-102704.

Nokia Siemens Networks, Comparison of RANAP-based, RNSAP-based and HRNSAP-based solutions for HNB-HNB mobility, Nov. 15, 2010, 3GPP TSG-RAN WG3#70 R3-103582.

3GPP TS 25.413 V11.2.0 (Dec. 2012), 3rd Generation Partnership Project; Technical Specification Group Radio Access Network; UTRAN Iu interface, Radio Access Network Application Part (RANAP) signalling (Release 11).

3GPP TS 25.423 V11.4.0 (Dec. 2012), 3rd Generation Partnership Project; Technical Specification Group Radio Access Network; UTRAN Iur interface Radio Network Subsystem Application Part (RNSAP) signalling (Release 11).

3GPP TS 25.467 V11.1.0 (Dec. 2012), 3rd Generation Partnership Project; Technical Specification Group Radio Access Network; UTRAN architecture for 3G Home Node B (HNB); Stage 2 (Release 11).

3GPP TS 25.468 V11.1.0 (Dec. 2012), 3rd Generation Partnership Project; Technical Specification Group Radio Access Network; UTRAN Iuh Interface RANAP User Adaption (RUA) signalling (Release 11).

3GPP TS 25.469 V11.1.0 (Dec. 2012), 3rd Generation Partnership Project; Technical Specification Group Radio Access Network; UTRAN Iuh interface Home Node B (HNB) Application Part (HNBAP) signalling (Release 11).

3GPP TS 25.471 V11.1.0 (Dec. 2012), 3rd Generation Partnership Project; Technical Specification Group Radio Access Network; UTRAN Iurh interface Radio Network Subsystem Application Part (RNSAP) User Adaption (RNA) signalling (Release 11).

3GPP TS 36.300 V11.4.0 (Dec. 2012), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

3GPP TS 36.307 V11.2.0 (Sep. 2012), 3rd Generation Partnership Project; Technical Specification Group Radio Access Network; Evolved Universal Terrestrial Radio Access (E-UTRA); Requirements on User Equipments (UEs) Supporting a release-independent Frequency band (Release 11).

3GPP TS 36.423 V11.3.0 (Dec. 2012), 3rd Generation Partnership Project; Technical Specification Group Radio Access Network; Evolved Universal Terrestrial Radio Access Network (E-UTRAN); X2 application protocol (X2AP) (Release 11).

International Search Report for PCT/JP2014/000573 dated May 13, 2014 English Translation.

Communication dated Jan. 31, 2017, from the Japanese Patent Office in counterpart Japanese application No. 2015-522474.

Alcatel-Lucent, Review Changes, 3GPP TSG-RAN WG3#72 R3-111210, May 9, 2011, pp. 2-15E (14 pages).

* cited by examiner

| IE/Group Name | Range |
|---|---|
| Message Type | |
| Old Iu Signalling Connection Identifer | |
| RABs Setup List | |
| ⋮ | ⋮ |
| >Source Side Iu DL TNL Information | |
| >>Transport Layer Address | |
| >>Transport Association | |

ADDED { (last three rows)

Fig. 5

| IE/Group Name | Range |
|---|---|
| RAB List | |
| >RAB ID | |
| >Old Transport Info | |
| >New Transport Info | |
| >CN Domain Indicator | |
| >Old Transport info invalid indicator (ADDED) | |

Fig. 8

| IE/Group Name | Range |
|---|---|
| Message Type | |
| Transaction ID | |
| ⋮ | ⋮ |
| >>Source Side Iu DL TNL Information | |
| >>>Transport Layer Address | |
| >>>Transport Association | |

(ADDED: Source Side Iu DL TNL Information, Transport Layer Address, Transport Association)

Fig. 10

| IE/Group Name | Range |
|---|---|
| Message Type | |
| Source RNC To Target RNC Transparent Container | |
| ⋮ | ⋮ |
| RABs To Be Setup List | |
| >RABs To Be Setup Item IEs | |
| ⋮ | ⋮ |
| >>Source Side Iu DL TNL Information | |
| >>>Transport Layer Address | |
| >>>Transport Association | |

ADDED: >>Source Side Iu DL TNL Information, >>>Transport Layer Address, >>>Transport Association

Fig. 11

| IE/Group Name | Range |
|---|---|
| Message Type | |
| Context-ID | |
| RAB List | |
| >RAB ID | |
| >Old Transport Info | |
| >New Transport Info | |

(RAB List, >RAB ID, >Old Transport Info, >New Transport Info are ADDED)

Fig. 12

COMMUNICATION SYSTEM, BASE STATION, GATEWAY DEVICE, BASE STATION CONTROL METHOD, AND GATEWAY DEVICE CONTROL METHOD

CROSS REFERENCE TO RELATED APPLICATIONS

This application is a National Stage of International Application No. PCT/JP2014/000573 filed Feb. 4, 2014, claiming priority based on Japanese Patent Application No. 2013-122895 filed Jun. 11, 2013, the contents of all of which are incorporated herein by reference in their entirety.

TECHNICAL FIELD

The present invention relates to a communication system, a base station, a gateway device, a base station control method, and a gateway device control method, and more particularly, to a handover of a base station.

BACKGROUND ART

A small base station (femtocell) which is called an HNB (Home Node B: home base station) and is assumed to be used, for example, at home has been studied. A femtocell is, for example, a micro/low-power indoor base station which covers an area within a radius of several meters to several tens of meters and is used for mobile communication services. A radio wave from a macrocell may not reach some locations such as indoors. The femtocell is an indoor base station for constructing a stable radio communication environment for an area in which the communication environment is poor and radio waves from macrocell stations do not reach. In the near future, it is expected that a large number of femtocells (HNBs) will be subordinate to a macrocell.

Since the femtocell (HNB) covers a small area, when a mobile station is moving, handover occurs more frequently in the femtocell than in the macrocell. Accordingly, a smooth handover control for the femtocell (HNB) is important. 3GPP (Third Generation Partnership Project) presents communication using a logical interface called Iurh for a handover between HNBs. Non Patent Literature 3 relating to the 3GPP defines Iurh Interface for performing communication by RNSAP (Radio Network Subsystem Application Part) Signalling between HNBs.

Non Patent Literature 1 to 9 disclose femtocells (HNBs) that perform communication via Iurh Interface. Patent Literature 1 presents a data transmission method for reducing data transmission paths for femtocells.

CITATION LIST

Patent Literature

[Patent Literature 1] Published Japanese Translation of PCT International Publication for Patent Application, No. 2012-521710

Non Patent Literature

[Non Patent Literature 1] 3GPP TS25.413 Ver.11.2.0
[Non Patent Literature 2] 3GPP TS25.423 Ver.11.4.0
[Non Patent Literature 3] 3GPP TS25.467 Ver.11.1.0
[Non Patent Literature 4] 3GPP TS25.468 Ver.11.1.0
[Non Patent Literature 5] 3GPP TS25.469 Ver.11.1.0
[Non Patent Literature 6] 3GPP TS25.471 Ver.11.1.0
[Non Patent Literature 7] 3GPP TS36.300 Ver.11.4.0
[Non Patent Literature 8] 3GPP TS36.307 Ver.11.2.0
[Non Patent Literature 9] 3GPP TS36.423 Ver.11.3.0

SUMMARY OF INVENTION

Technical Problem

Patent Literature 1 does not present any technique for reducing failures of a handover between HNBs. Non Patent Literature 1, Non Patent Literature 2, Non Patent Literature 3, Non Patent Literature 5, and Non Patent Literature 6 disclose a handover between HNBs which are connected via Iurh. However, in the handover between HNBs connected via Iurh as disclosed in the above-mentioned patent literature, transport layer Information which has been used for DL (DownLink) by a Source HNB (source base station) is not transmitted to a Target HNB (target base station).

As a result, when the Target HNB transmits a DL transport information message to an HNB-GW (Home NodeB-GateWay), the transport layer information, which is a mandatory parameter for the DL that has been used by the Source HNB, cannot be properly set, which may cause a failure of the handover between the HNBs.

It is an object of the present invention to provide a communication system, a base station, a gateway device, a base station control method, and a gateway device control method which are capable of reducing failures of a handover between HNBs and capable of continuing communication.

Solution to Problem

A first exemplary aspect of the present invention is a communication system including: a terminal; a first base station to which the terminal is connected before movement; a second base station to which the terminal is connected after movement; and a gateway device that connects the first base station and the second base station to an upper network so that they are able to communicate with each other. The first base station transmits, to the second base station, a first signal to request the second base station to start a handover, the first signal including transport information which has been used for data downlink data transmission by the gateway device and the first base station communicating with the gateway device during a handover of the terminal. The second base station receives the first signal and transmits, to the gateway device, a second signal to request the gateway device to update the transport information, the second signal including the transport information. The gateway device receives the second signal and hands over the transport information of the first base station to a communication with the second base station.

A second exemplary aspect of the present invention is a base station including transmission means for transmitting, when a handover occurs during communication with a terminal, a first signal to a second base station, the first signal requesting the second base station to start the handover and including transport information which has been used for downlink data transmission by the base station and the gateway device.

A third exemplary aspect of the present invention is a base station including: reception means for receiving, when a handover of a terminal communicating with a first base station occurs, a first signal for requesting to start the handover, the first signal including transport information which has been used for downlink data transmission by the first base station and a gateway device; and transmission means for transmitting, to the gateway device, a second signal to request the gateway device to update the transport information, the second signal including the transport information.

A fourth exemplary aspect of the present invention is a gateway device including: reception means for receiving, when a handover of a terminal communicating with a first base station occurs, a second signal for requesting to update transport information, the second signal being transmitted from a second base station and including the transport information which has been used for downlink data transmission by the first base station and the gateway device; and handover means for handing over the transport information to a communication with the second base station.

A fifth exemplary aspect of the present invention is a method for controlling a base station, including: receiving, when a handover of a terminal communication with a first base station occurs, a first signal for requesting to start the handover, the first signal including transport information which has been used for downlink data transmission by the first base station and a gateway device; and transmitting, to the gateway device, a second signal to request the gateway device to update the transport information, the second signal including the transport information.

A sixth exemplary aspect of the present invention is a method for controlling a gateway device, including: receiving, when a handover of a terminal communicating with a first base station occurs, a second signal for requesting to update transport information, the second signal being transmitted from a second base station and including the transport information which has been used for downlink data transmission by the first base station and the gateway device; and handing over the transport information to a communication with the second base station.

Advantageous Effects of Invention

According to the present invention, it is possible to provide a communication system, a base station, a gateway device, a base station control method, and a gateway device control method which are capable of reducing failures of a handover between HNBs and capable of continuing communication.

BRIEF DESCRIPTION OF DRAWINGS

FIG. 5 is a table showing configurations of parameters added to RANAP Enhanced Relocation Information Request in the first exemplary embodiment of the present invention;

FIG. 8 is a table in which a parameter of Old Transport info Invalid indicator is added to an HNBAP: TNL UPDATE REQUEST message according to the second exemplary embodiment of the present invention;

FIG. 10 is a table in which Transport Layer Address and Iu Transport Association are added to RNSAP Enhanced Relocation Request as Source Side Iu DL TNL Information according to a third exemplary embodiment of the present invention;

FIG. 11 is a table in which Transport Layer Address and Iu Transport Association are added to an RNA: CONNECT message as Source Side Iu DL TNL Information according to a fourth exemplary embodiment of the present invention;

FIG. 12 is a table in which RAB ID, Old Transport Info, and New Transport Info are added in an RAB List when a Target HNB transmits an HNBAP Relocation Complete message to an HNB-GW according to a twelfth exemplary embodiment of the present invention;

DESCRIPTION OF EMBODIMENTS

Matters studied by the present inventor to achieve the present invention will now be described. Non Patent Literature 3 defines Iuh Interface as a standard interface for communication between an HNB (small base station) and an HNB-GW (gateway device). Iurh Interface is presented as an interface for communication between HNBs. The Iuh and Iurh interfaces will be described below.

1. Iuh Interface

In a handover between HNBs, the HNBs transmit, to the HNB-GW, an HNBAP (Home Node B Application Protocol): TNL (Transport Network Layer) UPDATE REQUEST/RESPONSE message for updating transport layer information, and an HNBAP: Relocation Complete message indicating the completion of a handover, by using Iuh Interface. HNBAP (Home Node B Application Protocol), RANAP (Radio Access Network Application Part), RUA (RANAP User Adaptation), and SABP (Service Area Broadcast Protocol) are used for Iuh Interface. In other words, the HNBs use Iuh Interface to communicate with the HNB-GW (see Annex B in Non Patent Literature 3).

2. Iurh Interface

HNBs transmit and receive data using connection-oriented or connectionless data transfer between the HNBs via Iurh Interface. In a handover between HNBs, the HNBs transmit and receive RNA (RNSAP (Radio Network Subsystem Application Part) User Adaption) Connect/Transfer/Disconnect message by using Iurh Interface. The RNA message can carry RNSAP message. RNSAP (Radio Network Subsystem Application Part) and RNA (RNSAP User Adaption) are used for Iurh Interface. In other words, an HNB uses Iurh Interface to communicate with another HNB (see Annex B in Non Patent Literature 3).

Figure 13:
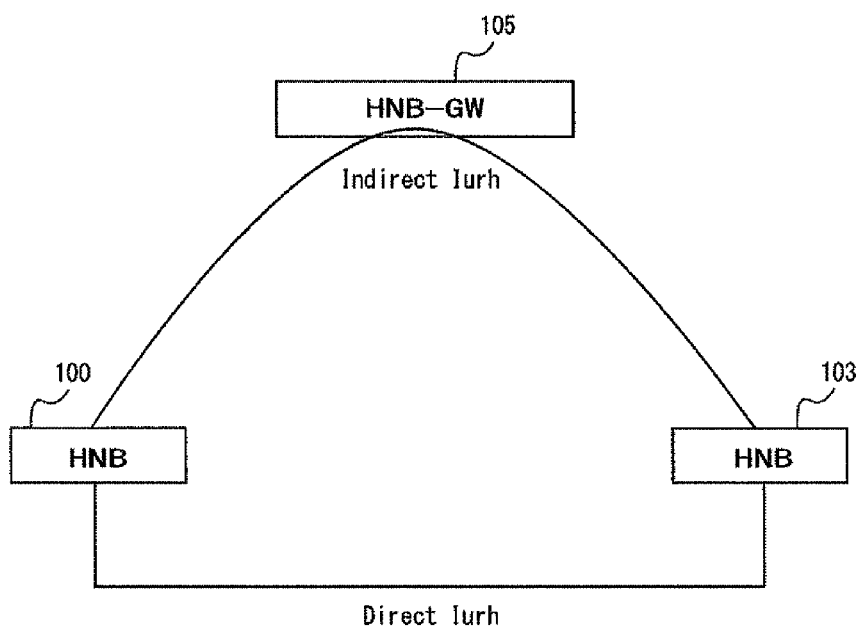
FIG. 13 is a diagram showing Iurh Interface for communication between an HNB and an HNB-GW.

FIG. 13 is a diagram showing Iurh Interface for communication between an HNB and an HNB-GW. As shown in FIG. 13, the Iurh Interface has two connection methods, i.e., Direct Iurh and Indirect Iurh. Direct Iurh is a connection method for directly connecting Iurh between HNBs. Indirect Iurh is a method for establishing an Iurh connection between HNBs via the HNB-GW, or a connection method for establishing an Iurh connection between HNBs via an SeGW (Security Gateway) (See Annex B in Non Patent Literature 3).

Figure 14:
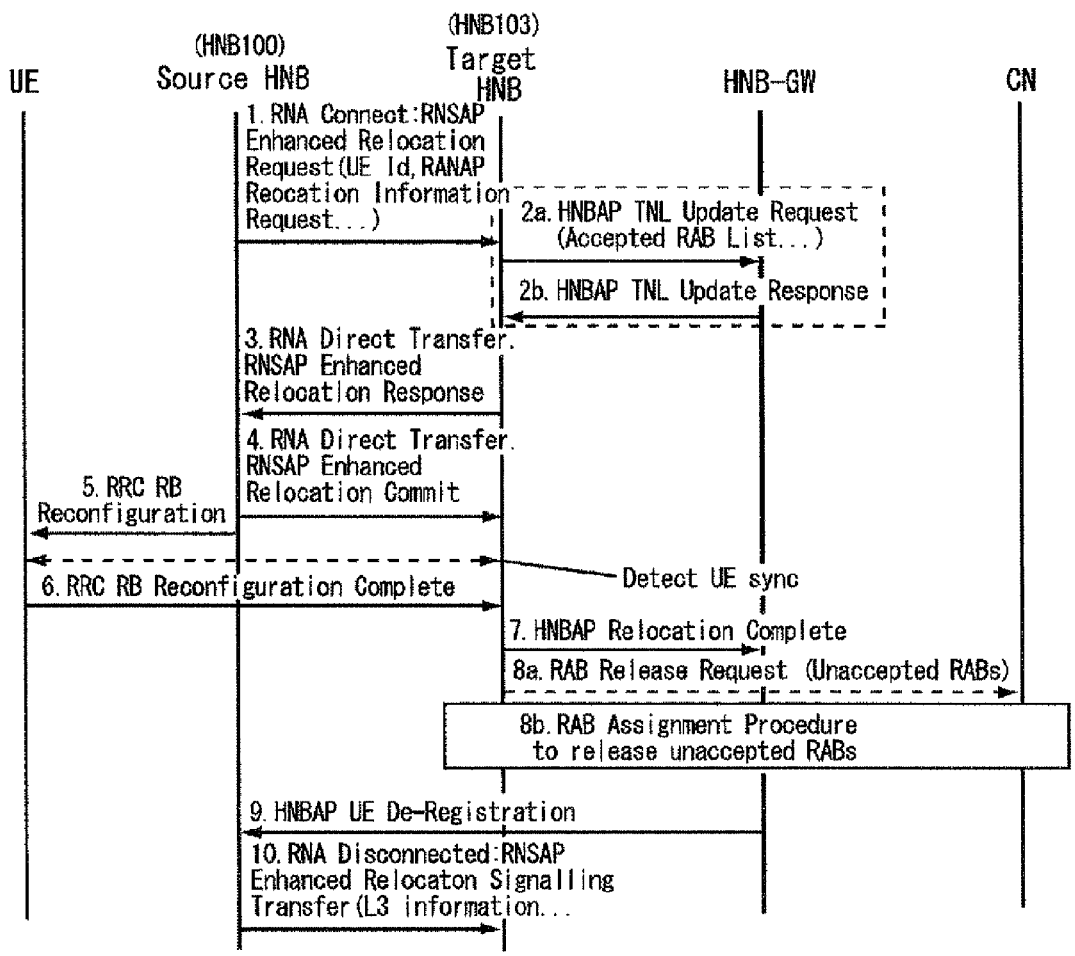
FIG. 14 is a sequence diagram showing a handover process between HNBs disclosed in Non Patent Literature 3.

FIG. 14 is a sequence diagram showing a handover process between HNBs disclosed in Non Patent Literature 3. Hereinafter, a Source HNB is referred to as an HNB 100 and a Target HNB is referred to as an HNB 103, as needed.

In step 1, the HNB 100 transmits an RNA CONNECT message to the HNB 103. The RNA Connect message includes, for example, Message Type, Transaction ID, Cause value, Permanent NAS UE Identity, and RANAP Enhanced Relocation Information Request. The RANAP Enhanced Relocation Information Request includes, for example, Message Type, Source RNC To Target RNC Transparent Container, and RABs (Radio Access Bearer) To Be Setup List.

In step 2a, the HNB 103 requests the HNB-GW to update TNL (Transport Network Layer) information (transport information). Accordingly, a message for transmitting an HNBAP: TNL UPDATE REQUEST message to the HNB-GW includes Message Type, Context-ID, RAB (Radio Access Bearer) List, and Update Cause. Note that an RAB List IE (Information Element) includes RAB ID, Old Transport Info, New Transport Info, and CN Domain Indicator.

In step 2b, the HNB-GW transmits an HNBAP: TNL UPDATE RESPONSE message to the HNB 103. The message includes, for example, Message Type and Context-ID. Step 3 and subsequent steps are not directly associated with this exemplary embodiment, and thus the description thereof will be omitted. In step 1, the Source HNB 100 transmits the transport layer information to the Target HNB 103, but does not transmit DL transport layer information which has been used by the HNB 100.

In step 2a, the HNB 103 notifies the HNB-GW that DL data transmitted from the HNB-GW is transmitted to the HNB 103 from the HNB 100. Accordingly, it is necessary for the HNB 103 to transmit, to the HNB-GW, the DL transport layer information on the HNB 103 and the transport layer information which has been used for the DL by the HNB 100. However, since the HNB 103 cannot learn the transport layer information on the HNB 100, the HNB 103 cannot transmit, to the HNB-GW, the transport layer information which has been used for the DL by the HNB 100.

Figure 15:
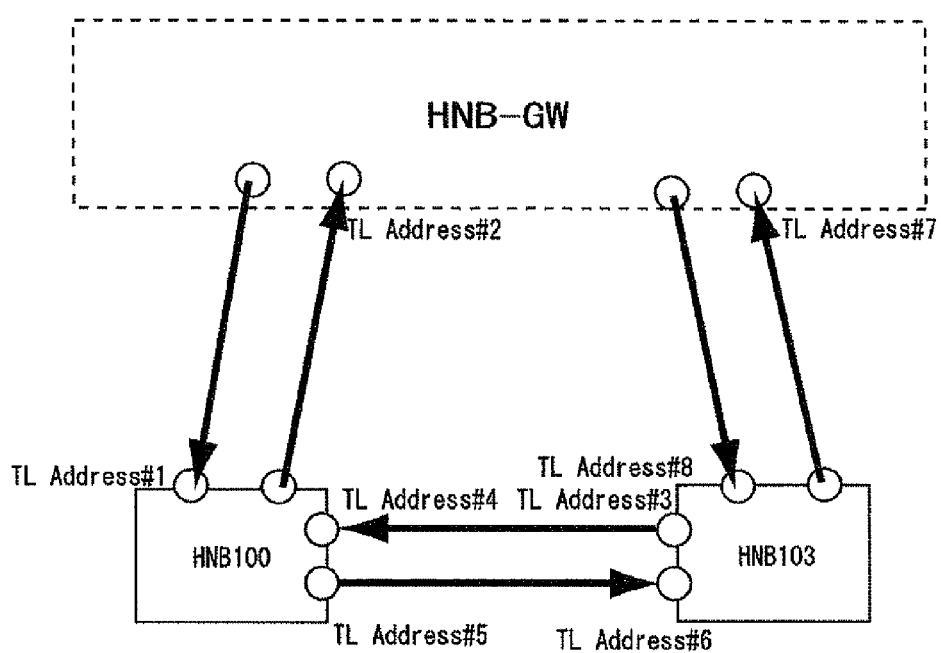
FIG. 15 is a diagram showing Transport Layer Addresses used for a handover between HNBs connected via Iurh.

FIG. 15 is a diagram showing Transport Layer Addresses used for a handover between HNBs connected via Iurh. The Transport Layer Address is abbreviated as TL Address in FIG. 15. FIG. 15 shows the Transport Layer Address used by HNBs in a handover between the HNBs. When the HNB 100 and an HNB-GW 105 are connected, the HNB 100 uses UL Transport Layer Address#2 of the HNB-GW 105 and DL Transport Layer Address#1 of the HNB 100.

The RANAP Enhanced Relocation Information Request, which is the RNA Connect message transmitted from the HNB 100 to the HNB 103, includes the UL Transport Layer Address#2 of the HNB-GW that is transmitted to the HNB-GW from the HNB 100. However, the HNB 100 does not include, in the RANAP Enhanced Relocation Information Request, the Transport Layer Address#1 of the Source HNB 100 which has been used for the DL. Further, the HNB 100 notifies the HNB 103 of Transport Layer Address#4 used for data forwarding (data transfer) between the HNBs. In the above-mentioned process, the HNB 103 does not learn the Transport Layer Address#1 of the HNB 100.

After that, the HNB 103 transmits, to the HNB-GW, the HNBAP: TNL UPDATE REQUEST in which Transport Layer Addresses used for DL data transmission are included in Old Transport Info and New Transport Info, respectively. However, since the HNB 103 does not learn the Transport Layer Address#1 of the HNB 100, the HNB 103 cannot set a correct value for Old Transport InfoIE. Additionally, there is a problem that the HNB-GW cannot verify a change from any one of DL Transport Layer Addresses to the Transport Layer Address of the Target HNB 103.

As a result, in the handover between the HNBs, the HNB-GW cannot properly set mandatory parameters and thus cannot verify a change from any one of the DL Transport Layer Addresses to the Transport Layer Address of the Target HNB. This may cause a failure of the handover between the HNBs. The present invention has been made in view of the above-mentioned problems.

First Exemplary Embodiment

In a communication system 1000 according to this exemplary embodiment, during a handover (H/O) between HNBs using Iurh Interface between HNBs, a Source HNB 100 (first base station) transmits information about the Source HNB 100 to a Target HNB 103 (second base station). Specifically, in a case where the Source HNB 100 receives data from an HNB-GW 105 (gateway device), the Source HNB 100 receives DL transport layer information. In this case, during the handover, the Source HNB 100 transmits, to the Target HNB 103, the DL transport layer information (transport information) which has been used for downlink data transmission.

Further, in the communication system 1000, the Target HNB 103 transmits, to the HNB-GW 105, the DL transport layer information which has been used by the Source HNB 100. The HNB-GW 105 is configured to properly hand over the DL transport layer information for the Source HNB 100 to the DL transport layer information for the Target HNB 103 in the Iurh handover.

Figure 1:
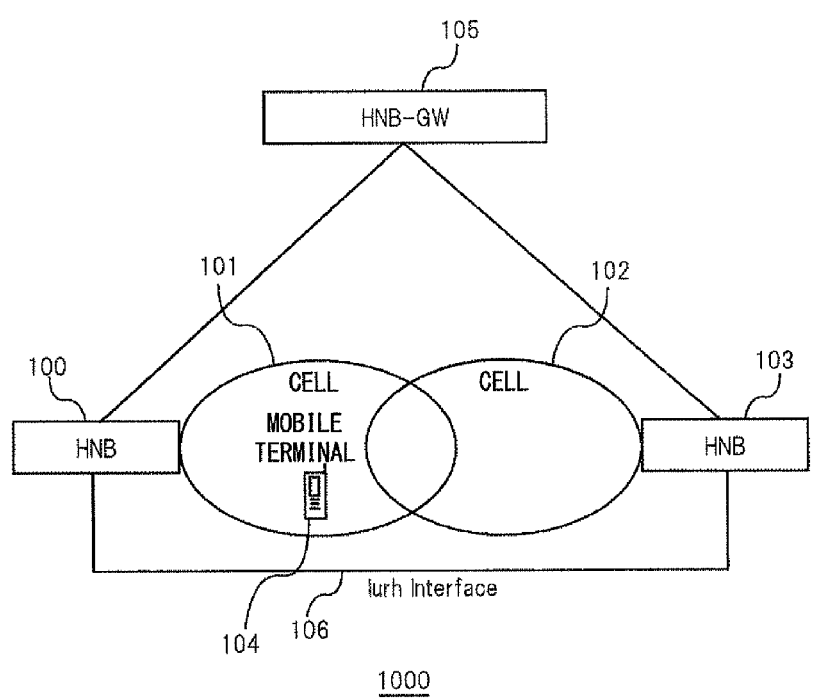
FIG. 1 is a diagram showing a configuration of a communication system 1000 according to a first exemplary embodiment of the present invention.

FIG. 1 is a diagram showing the configuration of the communication system 1000 according to the first exemplary embodiment of the present invention. The communication system 1000 includes the HNB 100, the HNB 103, the HNB-GW 105, and a terminal 104. The HNB 100 and the HNB 103 are HNBs having an interface to exchange cell information and handover information about UE (User Equipment) in the handover between the HNBs. The HNB 100 and the HNB 103 communicate with each other via the Iurh Interface.

The HNB-GW 105 communicates with the HNB 100 and the HNB 103 via the Iuh Interface, and controls and manages the connection with the HNBs. The HNB-GW 105 connects the HNB 100 and the HNB 103 to an upper network so that they are able to communicate with each other. The HNB-GW 105 also includes an interface. The terminal 104 is a mobile terminal (mobile station) that performs radio communication with the HNB 100 and the HNB 103. A cell 101 which is controlled by the HNB 100 and a cell 102 which is controlled by the HNB 103 are adjacent to each other. In this case, Iurh Interface is used as an interface between the HNBs. That is, the communication system 1000 is a system in which radio communication is established among the HNBs 100 and 103, the HNB-GW 105, and the terminal 104.

Figure 2:
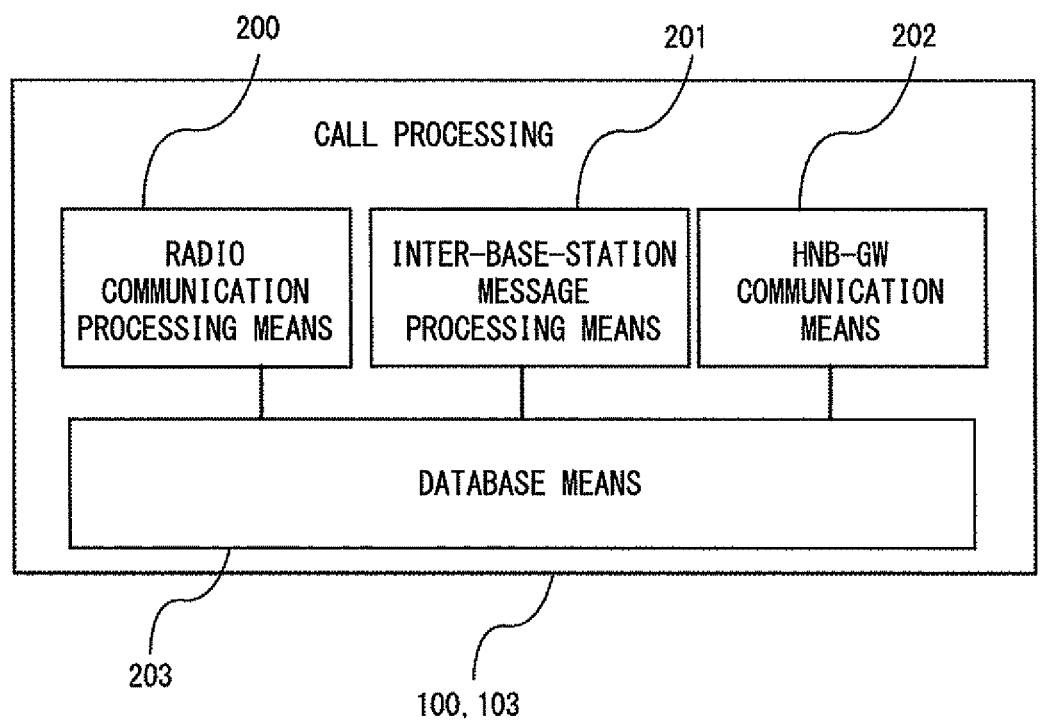
FIG. 2 is a block diagram showing a configuration of HNBs 100 and 103 according to the first exemplary embodiment of the present invention.

FIG. 2 is a block diagram showing the configuration of the HNBs 100 and 103 according to the first exemplary embodiment of the present invention. The HNBs 100 and 103 each include a radio communication processing unit 200, an inter-base-station message processing unit 201, an HNB-GW 202 communication unit, and database means 203. The radio communication processing unit 200 transmits information to the terminal 104 and receives information from the terminal 104. In other words, the radio communication processing unit 200 serves as transmission means for transmitting information to the terminal 104 and as reception means for receiving information from the terminal 104.

The inter-HNB message processing unit 201 transmits and receives handover information necessary for a handover. In other words, the inter-HNB message processing unit 201 serves as transmission means for transmitting information to the HNBs and as reception means for receiving information from the HNBs.

The HNB-GW communication unit 202 transmits and receives handover information necessary for performing a handover with the HNB-GW 105 by using the Iuh Interface. In other words, the HNB-GW communication unit 202 serves as transmission means for transmitting information to the HNB-GW 105 and as reception means for receiving information from the HNB-GW 105.

In the database means 203, terminal information stored in the database means and HNB information on the corresponding HNB are updated as needed by the inter-HNB message processing unit and the HNB-GW communication unit.

Figure 3:
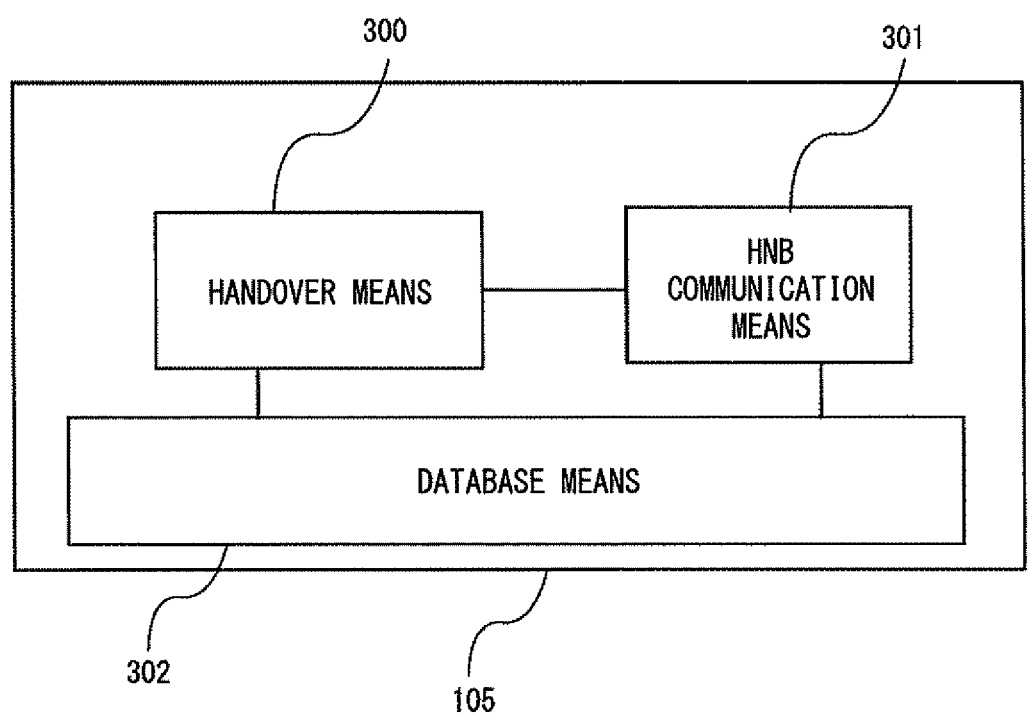
FIG. 3 is a block diagram showing a configuration of an HNB-GW 105 according to the first exemplary embodiment of the present invention.

FIG. 3 is block diagram showing the configuration of the HNB-GW 105 according to the first exemplary embodiment of the present invention. The HNB-GW 105 includes handover means 300, HNB communication means 301, and database means 302. The HNB communication means 301 transmits information to the HNBs 100 and 103 and receives information from the HNBs 100 and 103. The HNB-GW 105 also transmits and receives handover information necessary for performing a handover with the HNBs 100 and 103 by using the Iuh Interface.

In other words, the HNB communication means 301 serves as transmission means for transmitting information to the HNBs 100 and 103 and as reception means for receiving information from the HNBs 100 and 103. The handover means 300 switches the communication destination HNB of the HNB communication means 301 during the handover based on the handover information. In the database means 302, the stored terminal information and the HNB-GW information of the corresponding HNB are updated as needed by the HNB communication means 301.

Figure 4:
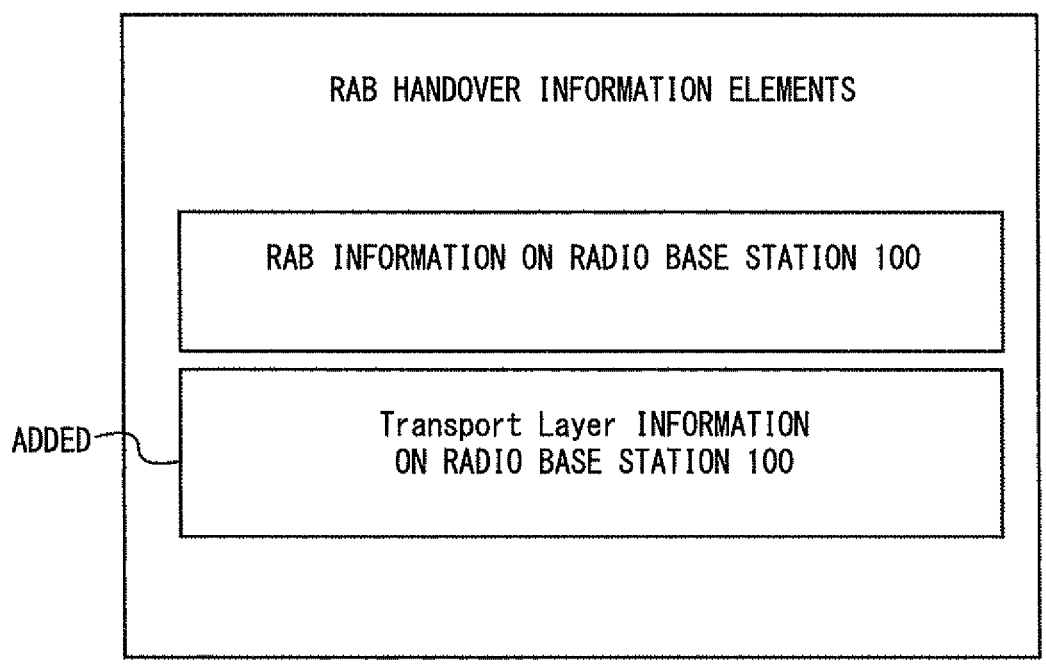
FIG. 4 is a diagram showing RAB handover elements of the HNB 100 that are transmitted from the HNB 100 to the HNB 103 according to the first exemplary embodiment of the present invention.

FIG. 4 is a diagram showing RAB handover information elements of the HNB 100 that are transmitted from the HNB 100 to the HNB 103 and are included in RANAP Enhanced Relocation Information Request according to the first exemplary embodiment of the present invention.

The RAB handover information elements transmitted from the HNB 100 to the HNB 103 are as follows.

RAB information on the HNB 100

Transport layer information on the HNB 100

FIG. 5 is a table showing configurations of parameters added to the RANAP Enhanced Relocation Information Request in this exemplary embodiment. In this exemplary embodiment, Source Side Iu DL TNL Information IE is added in an IE as DL transport layer information. In this exemplary embodiment, the IE includes UL transport information of the HNB-GW 105 that is transmitted from the HNB 100 to the HNB-GW.

That is, the Source Side Iu DL TNL Information IE that is transmitted from the HNB 100 to the HNB 103 in the first exemplary embodiment is defined as an IE different from the Source Side Iu UL TNL Information IE of the 3GPP. The RANAP Enhanced Relocation Information Request according to the first exemplary embodiment is referred to as a first signal. Note that the information to be transmitted from the Source HNB 100 to the Target HNB 103 may be included in any one of RNA, RNSAP, and RANAP messages.

Explanation of Processing of First Exemplary Embodiment

Processing of the communication system 1000 according to the first exemplary embodiment will be described below. In the following description, the components of the HNB 100 are denoted using a reference symbol "a" and the components of the HNB 103 are denoted using a reference symbol "b" in order to distinguish the components of the HNB 100 from the components of the HNB 103.

A process in Direct Iurh connection between the HNB 100 and the HNB 103 according to the exemplary embodiment as described below corresponds to RNA Connect message (step 1) during the handover between the HNBs shown in FIG. 14. Specifically, during the handover, the HNB 100 transmits, to the HNB 103, the RANAP Enhanced Relocation Information Request (first signal) to request the HNB 103 to start the handover.

Figure 6:
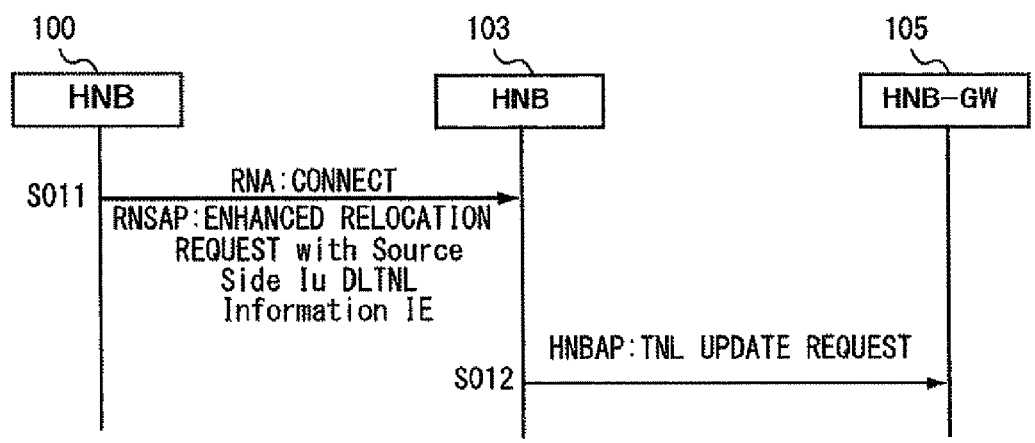
FIG. 6 is a sequence diagram showing a process between HNBs in which an HNBAP: TNL UPDATE REQUEST message is transmitted from the HNB 103 to the HNB-GW 105 when a terminal 104 performs a handover from the HNB 100 to the HNB 103.

FIG. 6 is a sequence diagram showing the process between the HNBs in which an HNBAP: TNL UPDATE REQUEST message (second signal) to request the HNB-GW 105 to update the transport information is transmitted from the HNB 103 to the HNB-GW 105 when the terminal 104 performs a handover from the HNB 100 to the HNB 103.

The HNB 100 communicates with the terminal 104 through a radio communication processing unit 200a. The terminal 104 moves to a position within the range of the cell 102 from a position within the range of the cell 101. The terminal 104 needs to hand over the communication destination from the HNB 100 to the HNB 103.

During the handover, in an inter-HNB message processing unit 201a of the Source HNB 100, database means 203a reads out the DL transport layer information (transport information) on the Source HNB 100. The inter-HNB message processing unit 201a of the HNB 100 transmits an RNA: Connect message to the HNB 103 (S011). At this time, the RNA CONNECT message includes the RANAP Enhanced Relocation Information Request (first signal) as shown in FIG. 5. In this case, the inter-HNB message processing unit 201a transmits the RANAP Enhanced Relocation Information Request (first signal) including the Source Side Iu DL TNL Information IE information (transport information) to the HNB 103.

A message processing unit 201b of the HNB 103 receives the RANAP Enhanced Relocation Information Request in which the Source Side Iu DL TNL Information IE information is added. The message processing unit 201b of the HNB 103 stores the Source Side Iu DL TNL Information IE (transport information) in database means 203b. An HNB-GW communication unit 202b of the HNB 103 reads out the Source Side Iu DL TNL Information IE (transport information) from the database means 203b. The HNB-GW communication unit 202b of the HNB 103 transmits an HNBAP: TNL UPDATE REQUEST (second signal) to the HNB-GW 105 (S012).

At this time, the HNB-GW communication unit 202b of the HNB 103 transmits the HNBAP: TNL UPDATE REQUEST message (second signal) including the Source Side Iu DL TNL Information IE (transport information). The HNB communication means 301 of the HNB-GW 105 receives the HNBAP: TNL UPDATE REQUEST (second signal) including the Source Side Iu DL TNL Information IE. The HNB communication means 301 of the HNB-GW 105 stores the DL transport layer information in the database means 302. By this process, the HNB-GW 105 hands over the DL transport layer information for the Source HNB 100 as the DL transport layer information for the Target HNB 103.

The HNB communication means 301 of the HNB-GW 105 transmits an HNBAP: TNL UPDATE RESPONSE message to the HNB 103. In the subsequent process (corresponding to step 3 and subsequent steps shown in FIG. 14), the handover means 300 of the HNB-GW 105 reads out the DL transport layer information from the database means 302 and switches the communication destination of the HNB communication means 301 from the HNB 100 to the HNB 103 based on the DL transport layer information for the HNB 100. The HNB 103 communicates with the terminal 104 through a radio communication processing unit 200b based on the DL transport layer information for the HNB 100, and the handover ends.

Explanation of Advantageous Effects

As described above, in the communication system 1000 according to the first exemplary embodiment of the present invention, the HNB 100 transmits the Source Side Iu DL TNL Information (first signal) to the HNB 103, thereby enabling the handover of the DL transport layer information between the HNBs. Further, in the communication system 1000, the HNBs can properly set the DL transport layer information in the HNB-GW 105, thereby making it possible to reduce failures of the handover between the HNBs. Furthermore, in the communication system 1000, the HNB-GW 105 can verify a change from any one of the DL Transport Layer Addresses to the Transport Layer Address of the Target HNB 103.

Second Exemplary Embodiment

As descried above regarding the matters reviewed by the present inventor, in step 2a shown in FIG. 14, the HNB 103 transmits, to the HNB-GW, the HNBAP: TNL UPDATE REQUEST in which Transport Layer Addresses used for DL data transmission are included in Old Transport Info and New Transport Info, respectively. Old Transport Layer IE is a mandatory parameter.

However, if the HNB 100 does not transmit, to the Target HNB 103, the transport layer information which has been used for the DL of the HNB 100, the HNB 103 does not learn the transport layer information on the HNB 100 in the HNBAP message, and thus cannot set a correct value for Old Transport InfoIE.

If the Source HNB 100 transmits incorrect DL transport layer information on the Source HNB 100 to the HNB-GW 105, the HNB-GW 105 may set incorrect DL transport layer information.

In this case, the HNB 103 cannot receive the DL data transferred from the HNB-GW 105 to the HNB 100. Further, the terminal that performs a handover from the HNB 100 to the HNB 103 may be disconnected from the service used in the HNB 100, and thus may not use the service continuously.

A case where the Target HNB 103 transmits the HNBAP message to the HNB-GW 105 during a handover between the HNBs which communicate with each other via the Iurh Interface will be considered. During the handover between the HNBs disclosed in Non Patent Literature 3, the Target HNB transmits the HNBAP: TNL UPDATE REQUEST message to the HNB-GW (step 2 shown in FIG. 14). The HNBAP is a control protocol for the HNB network over the Iuh Interface.

The HNBAP protocol provides the following functions.
Registration of HNB-GW and HNB
Identification of HNB
Registration of HNB-GW and UE through HNB Processing of the communication system 1000 according to this exemplary embodiment corresponds to transmission of the HNBAP: TNL UPDATE REQUEST (step 2a shown in FIG. 14) between the HNBs and the HNB-GW as shown in FIG. 14. The communication system 1000 according to this exemplary embodiment is configured to be able to change the HNBAP message to be transmitted from the Target HNB 103 to the HNB-GW 105.

In this exemplary embodiment, the communication system 1000 sets an Invalid indicator to disable setting of the transport layer information, to thereby eliminate the need for the Target HNB 103 to set, in the HNB-GW 105, the transport layer information which has been used by the Source HNB 100. Then the HNB 103 disables the DL transport layer information and transmits the disabled information to the HNB-GW 105.

Specifically, configuration information: Invalid indicator to disable setting of the DL transport layer information on the Source HNB 100 is added to the HNBAP TNL UPDATE REQUEST message (second signal) to be transmitted from the Target HNB 103 to the HNB-GW 105, and the HNBAP message including the configuration information is transmitted.

In other words, while the Target HNB 103 transmits, to the HNB-GW 105, the transport layer information on the Source HNB 100, the Target HNB 103 sets the configuration information: Invalid indicator to disable setting of the transport layer information on the Source HNB 100 that is a mandatory parameter, and transmits the set information to the HNB-GW 105.

Figure 7:
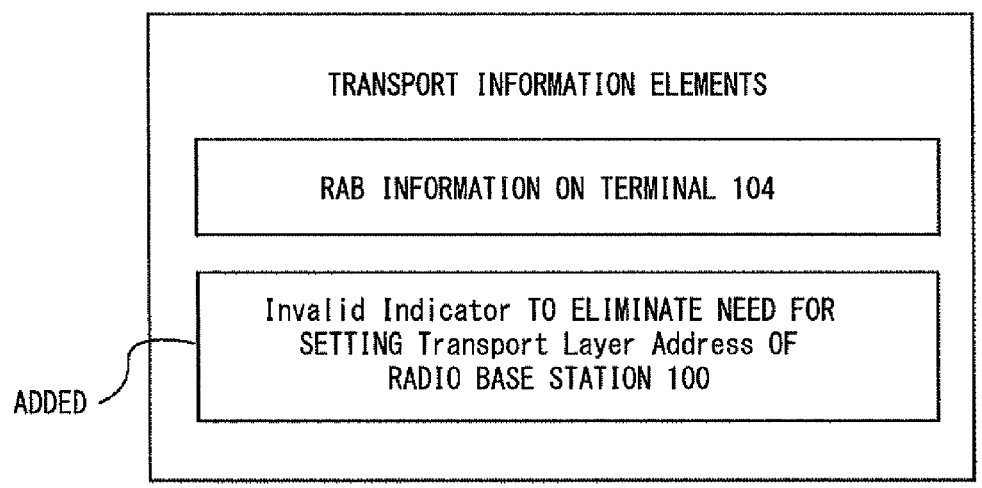
FIG. 7 is a diagram showing transport information elements of the HNB 103 that are transmitted from the HNB 103 to the HNB-GW 105 according to a second exemplary embodiment of the present invention.

FIG. 7 is a diagram showing transport information elements of the HNB 103 that are transmitted to the HNB-GW 105 from the HNB 103 according to the second exemplary embodiment of the present invention. FIG. 8 is a table in which a configuration information parameter of Old Transport info Invalid indicator is added to the HNBAP: TNL UPDATE REQUEST message (second signal) according to the second exemplary embodiment of the present invention. Information elements to be transmitted from the HNB 103 to the HNB-GW 105 are as follows.
RAB information on the terminal 104
Invalid indicator to eliminate the need for setting the Transport Layer Address of the HNB 100

Explanation of Processing

Processing of the communication system 1000 according to the second exemplary embodiment will be described. As shown in FIG. 8, when the HNB 103 transmits the HNBAP: TNL UPDATE REQUEST message (second signal) to the HNB-GW 105, the HNB 103 adds new configuration information to the HNBAP message to be transmitted.

Figure 9:
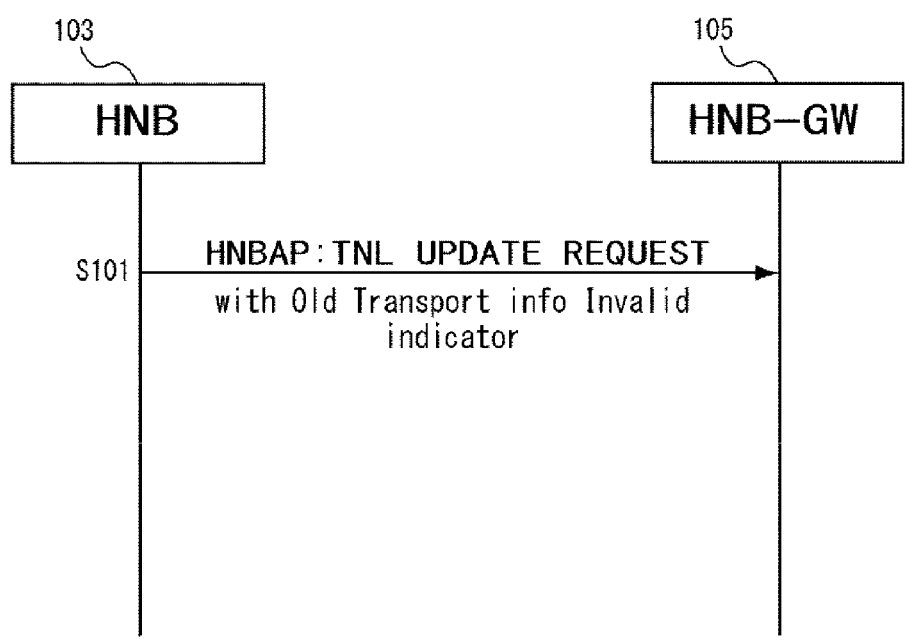
FIG. 9 is a sequence diagram showing a process in which the HNB 103 transmits the HNBAP: TNL UPDATE REQUEST message to the HNB-GW 105 according to the second exemplary embodiment of the present invention.

FIG. 9 is a sequence diagram showing a process in which the HNB 103 transmits the HNBAP: TNL UPDATE REQUEST message to the HNB-GW 105 according to the second exemplary embodiment of the present invention.

During a handover of the terminal 104 from the Source HNB 100 to the Target HNB 103, when the Source HNB 100 does not transmit, to the Target HNB 103, the transport layer information which has been used for the DL of the Source HNB 100, the Target HNB 103 does not receive the transport layer information which has been used for the DL of the Source HNB 100.

The inter-HNB message processing unit 201*b* of the Source HNB 103 reads out HNBAP TNL UPDATE Request message information on the Source HNB 103 from the database means 203*b*. The inter-HNB message processing unit 201*b* of the HNB 103 transmits, to the HNB-GW 105, the HNBAP TNL UPDATE Request message (second signal) of the HNB 103 including the configuration information of Old Transport info Invalid indicator (S101).

The HNB communication means 301 of the HNB-GW 105 receives the HNBAP TNL UPDATE Request message (second signal). The HNB communication means 301 of the HNB-GW 105 stores the HNBAP TNL UPDATE Request message information including the configuration information of Old Transport info Invalid indicator in the database means 302. The HNB communication means 301 of the HNB-GW 105 transmits the HNBAP: TNL UPDATE RESPONSE message (third signal) to the HNB 103.

In the subsequent process (corresponding to step 3 and subsequent steps shown in FIG. 14), the handover means 300 of the HNB-GW 105 reads out, from the database means 302, the DL transport layer information on the HNB 100 currently communicating therewith, and switches the communication destination of the HNB communication means 301 from the HNB 100 to the HNB 103 based on the DL transport layer information.

The HNB-GW 105 transmits the DL data from the HNB 100 to the HNB 103. The HNB 103 hands over the communication with the terminal 104 through the radio communication processing unit 200*b*. The HNB 103 communicates with the terminal 104 through the radio communication processing unit 200*b*, and the handover ends.

Explanation of Advantageous Effects

As described above, the DL transport layer information which has been used by the Source HNB 100 is not transmitted from the Source HNB 100 to the Target HNB 103 in some cases during a handover. On the other hand, the communication system 1000 according to this exemplary embodiment sets the configuration information: Old Transport info Invalid indicator, thereby enabling the handover between the HNBs using the Iurh Interface without setting the DL transport layer information on the Source HNB 100.

Third Exemplary Embodiment

In this exemplary embodiment, as shown in FIG. 10, Transport Layer Address and Iu Transport Association may be set as Source Side Iu DL TNL Information in an RNSAP Enhanced Relocation Request (first signal). The processing of the communication system 1000 is similar to that of the first exemplary embodiment.

Fourth Exemplary Embodiment

In this exemplary embodiment, as shown in FIG. 11, Transport Layer Address and Iu Transport Association may be added and set as Source Side Iu DL TNL Information in an RNA: CONNECT message. The processing of the communication system 1000 is similar to that of the first exemplary embodiment.

Fifth Exemplary Embodiment

In this exemplary embodiment, DL transport layer information on the Source HNB 100 may be handed over by Indirect Iurh Interface between HNBs via the HNB-GW 105 and an SeGW. The processing of the communication system 1000 is similar to that of the first exemplary embodiment.

Sixth Exemplary Embodiment

In this exemplary embodiment, Old Transport Info of an HNBAP: TNL UPDATE REQUEST (DL transport layer information which has been used by the HNB 100) may be changed from a mandatory parameter to an option parameter, and the DL transport layer information may not be set. The processing of the communication system 1000 is similar to that of the second exemplary embodiment.

Seventh Exemplary Embodiment

In this exemplary embodiment, Old Transport info Invalid indicator may be added in an RUA message (Non Patent Literature 4) for encapsulating and transferring an RANAP message between the HNB and the HNB-GW. The processing of the communication system 1000 is similar to that of the second exemplary embodiment.

Eighth Exemplary Embodiment

In this exemplary embodiment, the processing that is performed during a handover between HNBs may also be performed during a handover from the HNB to other radio base stations (eNB, HeNB, Donor eNB, Relay Node, RNC, etc.). The processing of the communication system 1000 is similar to that of the first and second embodiments.

Ninth Exemplary Embodiment

In this exemplary embodiment, the information to be transmitted from the Source HNB 100 to the Target HNB 103 may include MDT (Minimization of Drive Tests, Non Patent Literature 8), information about the occurrence of a radio link failure (Non Patent Literature 7), UE history information (Non Patent Literature 9), location information (Non Patent Literature 1), information about a Source HNB-GW, information about a Source SGSN and a Source MSC, information about IP-PBX, information about a local GW, local server information (for LIPA, SIPTO), PLMN information, and in-house GW information.

Tenth Exemplary Embodiment

In this exemplary embodiment, the processing that is performed during a handover between HNBs may also be performed during a handover from the HNB to a Wi-Fi® (wireless LAN) device, such as Access Point for wireless LAN, WLC (Wireless LAN Control), MAG (Mobility Access Gateway), or WAG (Wi-Fi Access Gateway). The processing of the communication system 1000 is similar to that of the ninth exemplary embodiment.

Eleventh Exemplary Embodiment

The processing of the communication system 1000 is similar to that of the first exemplary embodiment. In this exemplary embodiment, the same processing as that of the first exemplary embodiment may be performed in any protocol other than RNSAP and RNA protocols.

Twelfth Exemplary Embodiment

The configuration of the communication system 1000 is similar to that of the first exemplary embodiment. In this exemplary embodiment, when the Target HNB transmits an HNBAP Relocation Complete message to the HNB-GW in step 7 shown in FIG. 14, the RAB List in which RAB ID, Old Transport Info, and New Transport Info are added as shown in FIG. 12 may be transmitted.

Explanation of Advantageous Effects

The third, fourth, fifth, eleventh, and twelfth exemplary embodiments provide the same advantageous effects as those of the first exemplary embodiment. The sixth and seventh exemplary embodiments provide the same advantageous effects as those of the second exemplary embodiment. The eighth exemplary embodiment provides the same advantageous effects as those of the first and second exemplary embodiments.

The ninth exemplary embodiment has an advantageous effect that the Source HNB can properly hand over communication log information, network information, wireless information, and positional information to the Target HNB, thereby making it possible to perform a handover successfully and continue the communication.

The tenth exemplary embodiment has an advantageous effect that it is possible to properly hand over communication log information, network information, wireless information, and positional information also in a handover from the HNB to a Wi-Fi device, thereby making it possible to perform the handover successfully and continue the communication.

Other Exemplary Embodiments

The method for controlling the HNBs described above may be implemented using a semiconductor processing device including an ASIC (Application Specific Integrated Circuit). Further, the processes may be implemented by causing a computer system including at least one processor (e.g. a microprocessor, MPU, or DSP (Digital Signal Processor)) to execute a program. Specifically, one or more programs including an instruction set for causing the computer system to execute an algorithm for the transmission signal processing or reception signal processing may be created and the created programs may be provided to a computer.

These programs can be stored and provided to a computer using any type of non-transitory computer readable media. Non-transitory computer readable media include any type of tangible storage media.

Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

The programs may be provided to a computer using any type of transitory computer readable media. Examples of transitory computer readable media include electric signals, optical signals, and electromagnetic waves. Transitory computer readable media can provide the programs to a computer via a wired communication line, such as electric wires and optical fibers, or a wireless communication line.

Note that the present invention is not limited to the above exemplary embodiments, and can be modified as appropriate without departing from the scope of the invention.

The above exemplary embodiments are merely examples of the application of the technical idea obtained by the present inventor. That is, the technical idea is not limited only to the above exemplary embodiments, but can be modified in various ways.

For example, the whole or part of the exemplary embodiments disclosed above can be described as, but not limited to, the following supplementary notes.

(Supplementary Note 1)

A communication system comprising:
a terminal;
a first base station to which the terminal is connected before movement;
a second base station to which the terminal is connected after movement; and
a gateway device that connects the first base station and the second base station to an upper network so that they are able to communicate with each other, wherein
the first base station transmits, to the second base station, a first signal to request the second base station to start a handover, the first signal including transport information which has been used for downlink data transmission by the gateway device and the first base station communicating with the gateway device during a handover of the terminal,
the second base station receives the first signal and transmits, to the gateway device, a second signal to request the gateway device to update the transport information, the second signal including the transport information, and
the gateway device receives the second signal and hands over the transport information of the first base station to a communication with the second base station.

(Supplementary Note 2)

The communication system according to Supplementary note 1, wherein the second base station transmits, to the gateway device, the second signal including configuration information to disable setting of the transport information.

(Supplementary Note 3)

The communication system according to Supplementary note 1 or 2, wherein the first base station transmits the first signal to the second base station via the gateway device.

(Supplementary Note 4)

A base station comprising transmission means for transmitting, when a handover occurs during communication with a terminal, a first signal to a second base station, the first signal requesting the second base station to start the handover and including transport information which has been used for downlink data transmission by the transmission means and a gateway device.

(Supplementary Note 5)

The base station according to Supplementary note 4, wherein the transmission means transmits the first signal to the second base station via the gateway device.

(Supplementary Note 6)

A base station comprising:
reception mean for receiving, when a handover of a terminal communicating with a first base station occurs, a first signal for requesting to start the handover, the first signal including transport information which has been used for downlink data transmission by the first base station and a gateway device; and
transmission means for transmitting, to the gateway device, a second signal to request the gateway device to update the transport information, the second signal including the transport information.

(Supplementary Note 7)

The base station according to Supplementary note 6, wherein the transmission means transmits, to the gateway device, the second signal including configuration information to disable setting of the transport information.

(Supplementary Note 8)

The base station according to Supplementary note 6 or 7, wherein the reception means receives the first signal via the gateway device.

(Supplementary Note 9)

A gateway device comprising:

reception means for receiving, when a handover of a terminal communicating with a first base station occurs, a second signal for requesting to update transport information, the second signal being transmitted from a second base station and including the transport information which has been used for downlink data transmission by the first base station and the gateway device; and handover means for handing over the transport information to a communication with the second base station.

(Supplementary Note 10)

The gateway device according to Supplementary note 9, wherein the reception means receives the second signal including configuration information to disable setting of the transport information, the second signal being transmitted from the second base station.

(Supplementary Note 11)

The gateway device according to Supplementary note 9 or 10, further comprising transmission means for transmitting, to the second base station, a first signal including the transport information received by the reception means from the first base station.

(Supplementary Note 12)

A method for controlling a base station, comprising:

transmitting, when a handover occurs during communication with a terminal, a first signal to a second base station, the first signal requesting the second base station to start the handover and including transport information which has been used for downlink data transmission by the base station and a gateway device, the base station and the gateway device being connected to an upper network so that they are able to communicate with each other.

(Supplementary Note 13)

The method for controlling a base station according to Supplementary note 12, wherein the first signal is transmitted to the second base station via the gateway device.

(Supplementary Note 14)

A method for controlling a base station, comprising:

receiving, when a handover of a terminal communicating with a first base station occurs, a first signal for requesting to start the handover, the first signal including transport information which has been used for downlink data transmission by the first base station and a gateway device; and transmitting, to the gateway device, a second signal to request the gateway device to update the transport information, the second signal including the transport information.

(Supplementary Note 15)

The method for controlling a base station according to Supplementary note 14, wherein the second signal including configuration information to disable setting of the transport information is transmitted to the gateway device.

(Supplementary Note 16)

The method for controlling a base station according to Supplementary note 14 or 15, wherein the first signal is received via the gateway device.

(Supplementary Note 17)

A method for controlling a gateway device, comprising:

receiving, when a handover of a terminal communicating with a first base station occurs, a second signal for requesting to update transport information, the second signal being transmitted from a second base station and including the transport information which has been used for downlink data transmission by the first base station and the gateway device; and handing over the transport information to a communication with the second base station.

(Supplementary Note 18)

The method for controlling a gateway device according to Supplementary note 17, wherein the second signal including configuration information to disable setting of the transport information is received from the second base station.

(Supplementary Note 19)

The method for controlling a gateway device according to Supplementary note 17 or 18, wherein the first signal including the transport information received from the first base station is transmitted to the second base station.

(Supplementary Note 20)

A non-transitory computer readable medium for causing a computer to execute a method for controlling a base station, the method comprising: transmitting, when a handover occurs during communication with a terminal, a first signal to a second base station, the first signal requesting the second base station to start the handover and including transport information which has been used for downlink data transmission by the base station and a gateway device, the base station and the gateway device being connected to an upper network so that they are able to communicate with each other.

(Supplementary Note 21)

The non-transitory computer readable medium for causing a computer to execute the method for controlling a base station according to Supplementary note 20, wherein the first signal is transmitted to the second base station via the gateway device.

(Supplementary Note 22)

A non-transitory computer readable medium for causing a computer to execute a method for controlling a base station, the method comprising:

receiving, when a handover of a terminal communicating with a first base station occurs, a first signal for requesting to start the handover, the first signal including transport information which has been used for downlink data transmission by the first base station and a gateway device; and transmitting, to the gateway device, a second signal to request the gateway device to update the transport information, the second signal including the transport information.

(Supplementary Note 23)

The non-transitory computer readable medium for causing a computer to execute the method for controlling a base station according to Supplementary note 22, wherein the second signal including configuration information to disable setting of the transport information is transmitted to the gateway device.

(Supplementary Note 24)

The non-transitory computer readable medium for causing a computer to execute the method for controlling a base station according to Supplementary note 22 or 23, wherein the first signal is received via the gateway device.

(Supplementary Note 25)

A non-transitory computer readable medium for causing a computer to execute a method for controlling a gateway device, the method comprising:

receiving, when a handover of a terminal communicating with a first base station occurs, a second signal for requesting to update transport information, the second signal being transmitted from a second base station and including the transport information which has been used for downlink data transmission by the first base station and the gateway device; and handing over the transport information to a communication with the second base station.

(Supplementary Note 26)

The non-transitory computer readable medium for causing a computer to execute the method for controlling a gateway device according to Supplementary note 25, wherein the second signal including configuration information to disable setting of the transport information is received from the second base station.

(Supplementary Note 27)

The non-transitory computer readable medium for causing a computer to execute the method for controlling a gateway device according to Supplementary note 25 or 26, wherein when the first signal including the transport information is received from the first base station, the first signal is transmitted to the second base station.

While the present invention has been described above with reference to exemplary embodiments, the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2013-122895, filed on Jun. 11, 2013, the disclosure of which is incorporated herein in its entirety by reference.

REFERENCE SIGNS LIST

100 HNB
101 CELL
102 CELL
103 HNB
104 TERMINAL
105 HNB-GW
106 Iurh Interface
200 RADIO COMMUNICATION PROCESSING MEANS
201 INTER-HNB MESSAGE PROCESSING MEANS
202 HNB-GW COMMUNICATION MEANS
203 DATABASE MEANS
300 HANDOVER MEANS
301 HNB COMMUNICATION MEANS
302 DATABASE MEANS
1000 COMMUNICATION SYSTEM

The invention claimed is:

1. A target base station, which is connected to a gateway device, comprising:
a transceiver configured to transmit an Old Transport Info comprising transport layer related information to the gateway device,
wherein the Old Transport Info is included in a Transport Network Layer (TNL) UPDATE REQUEST message and is a mandatory parameter in the message, and
wherein the TNL UPDATE REQUEST message includes an invalid indicator to disable setting of the transport layer related information used by a source base station in order to eliminate a need for the target base station to set, in the gateway device, the transport layer related information.

2. The target base station according to claim 1,
wherein the Old Transport Info is an information element which is transmitted during a handover from an another base station to the target base station of a mobile station, and
wherein the Old Transport Info is not used by the gateway device during the handover.

3. A gateway device, that is connected to a first base station and a second base station, comprising:
a transceiver configured to receive, an Old Transport Info comprising transport layer related information from the second base station, and
a controller configured to ignore the Old Transport Info,
wherein the Old Transport Info is included in a Transport Network Layer (TNL) UPDATE REQUEST message and is a mandatory parameter in the message,
wherein the TNL UPDATE REQUEST message includes an invalid indicator to disable setting of the transport layer related information used by the first base station in order to eliminate a need for the second base station to set, in the gateway device, the transport layer related information.

4. The gateway device according to claim 3,
wherein the Old Transport Info is an information element which is transmitted during a handover from the first base station to the second base station of a mobile station, and
wherein the controller does not use the Old Transport Info during the handover.

5. The target base station according to claim 1, wherein the transport layer related information comprises a transport layer address.

6. The gateway device according to claim 3, wherein the transport layer related information comprises a transport layer address.

7. A method performed by a target base station, which is connected to a gateway device, comprising:
transmitting an Old Transport Info comprising transport layer related information to the gateway device,
wherein the Old Transport Info is included in a Transport Network Layer (TNL) UPDATE REQUEST message and is a mandatory parameter in the message, and
wherein the TNL UPDATE REQUEST message includes an invalid indicator to disable setting of the transport layer related information used by a source base station in order to eliminate a need for the target base station to set, in the gateway device, the transport layer related information.

8. The method according to claim 7,
wherein the Old Transport Info is an information element which is transmitted during a handover from an another base station to the target base station of a mobile station, and
wherein the Old Transport Info is not used by the gateway device during the handover.

9. The method according to claim 7, wherein the transport layer related information comprises a transport layer address.

* * * * *